United States Patent [19]
Wakabayashi et al.

[11] Patent Number: 5,224,083
[45] Date of Patent: Jun. 29, 1993

[54] OBJECTIVE LENS DRIVING APPARATUS

[75] Inventors: Kanji Wakabayashi, Kyoto; Hironori Tomita; Tohru Nakamura, both of Katano; Noboru Kikuchi, Hirakata, all of Japan

[73] Assignee: Matsushita Electric Industrial Co., Ltd., Osaka, Japan

[21] Appl. No.: 556,000

[22] Filed: Jul. 16, 1990

[30] Foreign Application Priority Data

Jul. 19, 1989 [JP] Japan .................. 1-186435

[51] Int. Cl.$^5$ ............................... G11B 7/00
[52] U.S. Cl. ............... 369/44.27; 369/44.32; 369/44.25
[58] Field of Search ............ 369/44.11, 44.14, 44.15, 369/44.16, 44.17, 44.18, 44.19, 44.21, 44.22, 44.32, 44.27

[56] References Cited

U.S. PATENT DOCUMENTS

| | | | |
|---|---|---|---|
| 4,680,744 | 7/1987 | Kanamaru | 369/44.32 |
| 4,954,904 | 9/1990 | Goor | 360/75 |
| 5,036,507 | 7/1991 | Yamashita | 369/44.32 |
| 5,090,000 | 8/1992 | Nozu et al. | 369/44.25 |
| 5,140,575 | 8/1992 | Fushiki | 369/44.32 |

FOREIGN PATENT DOCUMENTS

59-186147 10/1984 Japan .
61-260430 11/1986 Japan .

*Primary Examiner*—Jeffery A. Brier
*Assistant Examiner*—Robert Chevalier
*Attorney, Agent, or Firm*—Wenderoth, Lind & Ponack

[57] ABSTRACT

From the start of descending of a disk-shaped recording medium in a direction of approaching an objective lens in the optical axis direction by a loading mechanism until it is set at a specified position with respect to a spindle motor, a DC current is supplied to an optical axis direction driving coil through an evading current feeding circuit in a direction for a movable part to depart from the disk-shaped recording medium, and the movable part is located at the remotest position from the disk-shaped recording medium due to an electromagnetic force generated by the DC current flowing in the optical axis direction driving coil and a permanent magnet, so that the disk-shaped recording medium and the objective lens will not collide against each other even if an objective lens with a short working distance is used.

2 Claims, 12 Drawing Sheets

OBJECTIVE LENS DRIVING APPARATUS

BACKGROUND OF THE INVENTION

1. Field of the Invention

The present invention relates to an objective lens driving apparatus of an apparatus for optically recording or reproducing information on a recording medium.

2. Description of the Prior Art

A conventional objective lens driving apparatus comprises a movable part consisting of an objective lens of an apparatus for writing or reading optical information on a disk-shaped recording medium installed at a specific position corresponding to a spindle motor by means of a loading mechanism and a lens holder mounting said objective lens, a base, four bar-shaped elastic support members having one end fixed on said base and supporting said movable part movably in the optical axis direction vertical with respect to the disk-shaped recording medium and in the radial direction parallel to the disc-shaped recording medium, an optical axis direction driving coil having a rotating axis in the optical axis direction and fixed on the movable part, a radial direction driving coil having a rotating axis in the radial direction and fixed on the movable part, and a driving magnet fixed on the base being disposed opposite to the side face of the optical axis direction driving coil and radial direction driving coil.

The operation of thus composed objective lens driving apparatus is generally as described below.

In the first place, before the optical axis direction driving coil and radial direction driving coil are energized, that is, in the initial state when the objective lens is not driven, the disk-shaped recording medium performs a loading action by the loading mechanism. That is, the disk-shaped recording medium is lowered in the direction of approaching the objective lens in the optical axis direction by the loading mechanism, and is installed at a specific position confronting the spindle motor.

Upon completion of the loading action of the disk-shaped recording medium, the focus control of the objective lens on the recording plane of the disk-shaped recording medium is started, and the objective lens is driven in the optical axis direction.

Driving of the objective lens in the direction of the optical axis is achieved as the optical axis direction driving coil fixed on the lens holder mounting the objective lens receives an electromagnetic force obtained as it orthogonally crosses the magnetic flux generated by the driving magnet installed on the base, and moves parallel since it is supported by the four bar-shaped elastic support members having one end fixed on the base.

In the objective lens driving apparatus, there is a growing demand for reduction of size and thickness of the apparatus, and accordingly a lens of small size is often used for the objective lens. Therefore, when using a small objective lens without lowering the precision of recording and reproducing, it is necessary to use an objective lens having a short working distance.

In the above construction, however, when the disk-shaped recording medium is lowered in the direction of approaching the objective lens in the optical axis direction by the loading mechanism and installed at a specified position with respect to the spindle motor, the disk-shaped recording medium may not be always lowered correctly depending on the mechanical precision of the loading mechanism or other circumstances. Therefore, when using an objective lens with a short working distance, the shorter the working distance of the objective lens, the closer approaches the objective lens to the installing position of the disk-shaped recording medium, which gives rise to an increased risk of collision of the disk-shaped recording medium against the objective lens.

SUMMARY OF THE INVENTION

In the light of the above problem, it is hence a primary object of the invention to present an objective lens driving apparatus capable of eliminating the risk of collision of disk-shaped recording medium and objective lens in the process of lowering of the disk-shaped recording medium to the installing position.

To solve the above problem, an objective lens driving apparatus of the invention comprises a movable part comprising an objective lens for writing or reading optical information on a plate-shaped recording medium installed at a specified position by a loading mechanism and a lens holder for holding said objective lens; a supporting means for supporting said movable part movably in an optical axis direction vertical to a recording surface of said plate-shaped recording medium; a fixing part for fixing said supporting means a driving means for driving said movable part in at least said optical axis direction relative to said fixing part, an evading means for moving the movable part in a direction departing from the plate-shaped recording medium in the optical axis direction during a loading action of the loading mechanism.

In this configuration, from the time the plate-shaped recording medium begins to descend in the direction of approaching the objective lens in the optical axis direction by the loading mechanism until it is installed at the specified position with respect to the spindle motor, the objective lens moves in the direction of departing from the plate-shaped recording medium and remains at a position avoiding collision against the plate-shaped recording medium, by the operation of the evading means for moving the movable part in a direction departing from the plate-shaped recording medium in the optical axis direction. Therefore, if using an objective lens with a short working distance, collision of the plate-shaped recording medium and objective lens may be avoided.

The invention is characterized by installing the evading means for moving the movable part comprising the objective lens and the lens holder for holding the objecting lens, in a direction of departing from the plate-shaped recording medium in the optical axis direction of the objective lens, wherein when the plate-shaped recording medium is lowered in the direction of approaching the objective lens in the optical axis direction by the loading mechanism and is installed at the specified position with respect to the spindle motor, the objective lens moves in a direction of departing from the plate-shaped recording medium so as to avoid collision against the plate-shaped recording medium. Therefore, even if an objective lens with short working distance is used, the collision of plate-shaped recording medium and the objective lens may be prevented.

DESCRIPTION OF THE PREFERRED EMBODIMENTS

Referring now to the drawings, an objective lens driving apparatus is described below as an embodiment of the invention, together with the loading mechanism of an information recording and reproducing apparatus including said objective lens driving apparatus.

Figure 5:
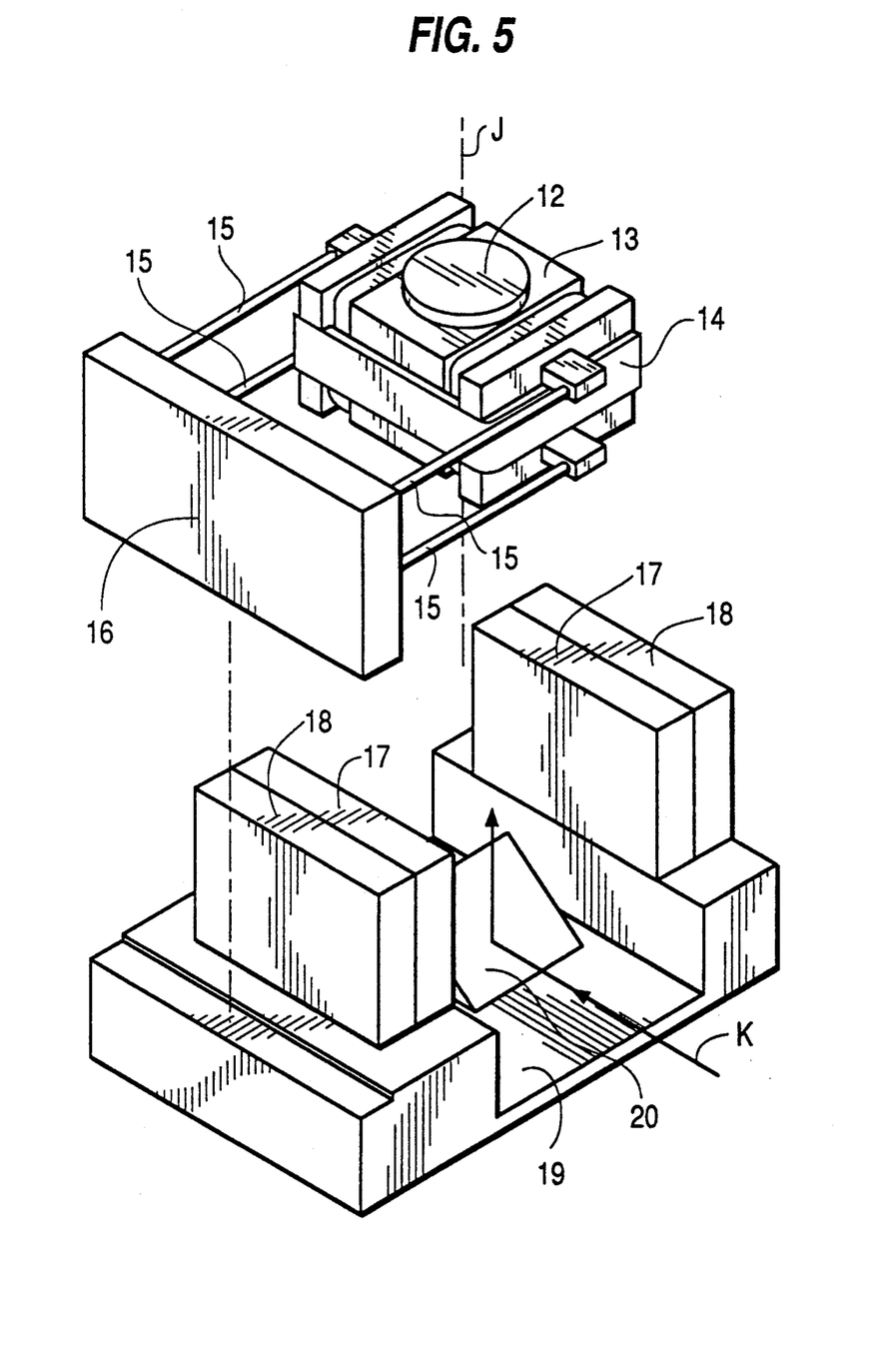
FIG. 5 is a perspective view showing the configuration of the objective lens driving apparatus in accordance with an embodiment of the present invention.
Figure 6:
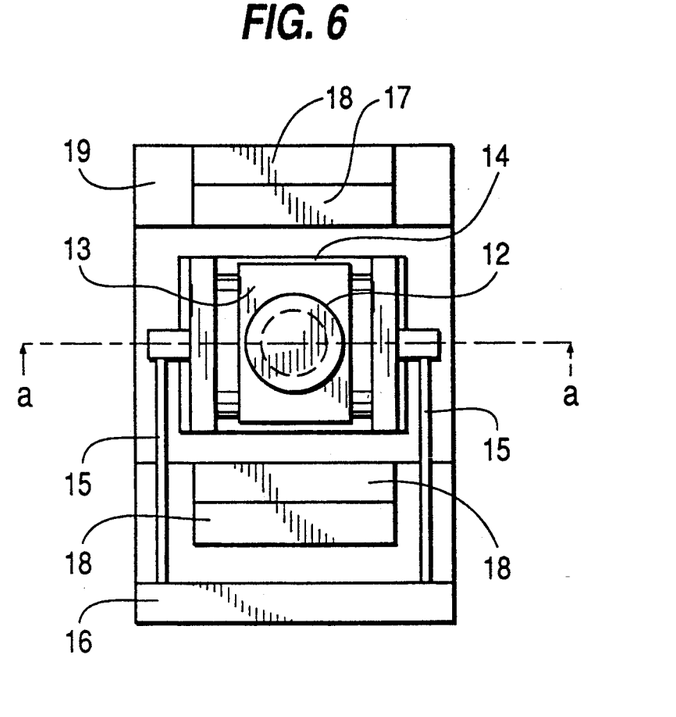
FIG. 6 is a front view showing the composition of the objective lens driving apparatus in accordance with an embodiment of the present invention.
Figure 7:
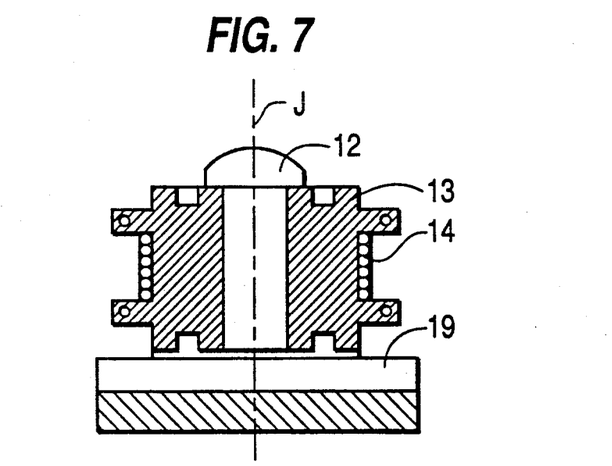
FIG. 7 is a sectional view of a—a of FIG. 6.

First, the objective lens driving apparatus as an embodiment of the invention is described while referring to FIG. 5 to FIG. 7. In FIG. 5 to FIG. 7, element 12 is an objective lens, element J is an optical axis direction of the objective lens 12, element K . . .; is an optical axis of a light beam element, 13 is a lens holder for change "12," to . . . 12 ; element mounting the objective lens 12, 14 is an optical axis direction driving coil having a rotating axis in the optical axis direction J of the objective lens 12 and fixed on the lens holder 13, element 16 is a fixing part, element 15 are four bar-shaped elastic support members having one end fixed to the fixing part 16 and supporting the lens holder 13 movably in the optical axis direction of the objective lens 12, element 17 are two permanent magnets disposed oppositely against the side face of the optical axis direction driving coil 14, element 18 are two magnetic yokes disposed through the permanent magnets 17 opposite to the side face of the optical axis direction driving coil 14, 19 is a base for fixing the fixing part 16, and the two change permanent magnets 17, and two magnetic yokes 18, and element 20 is a mirror for varying the direction of the optical axis K of the light beam, being fixed on the base 19.

In the thus composed objective lens driving apparatus, the driving of the objective lens 12 in the optical axis direction J is explained below.

To begin with, when an electric power is supplied to the optical axis direction driving coil 14 which is fixed on the lens holder 13 holding the objective lens 12, the optical axis direction driving coil 14 receives an electromagnetic force in the direction of the optical axis direction J of the objective lens 12 due to the electromagnetic action between the current flowing in the optical axis direction driving coil 14 and the magnetic flux generated by the permanent magnets 17 fixed on the base 19, and the lens holder 13 supported by the four bar-shaped elastic support members 15 having one end fixed on the fixing part 16 moves parallel to the optical axis direction J, so that the objective lens 12 is driven in the optical axis direction J.

Figure 2:
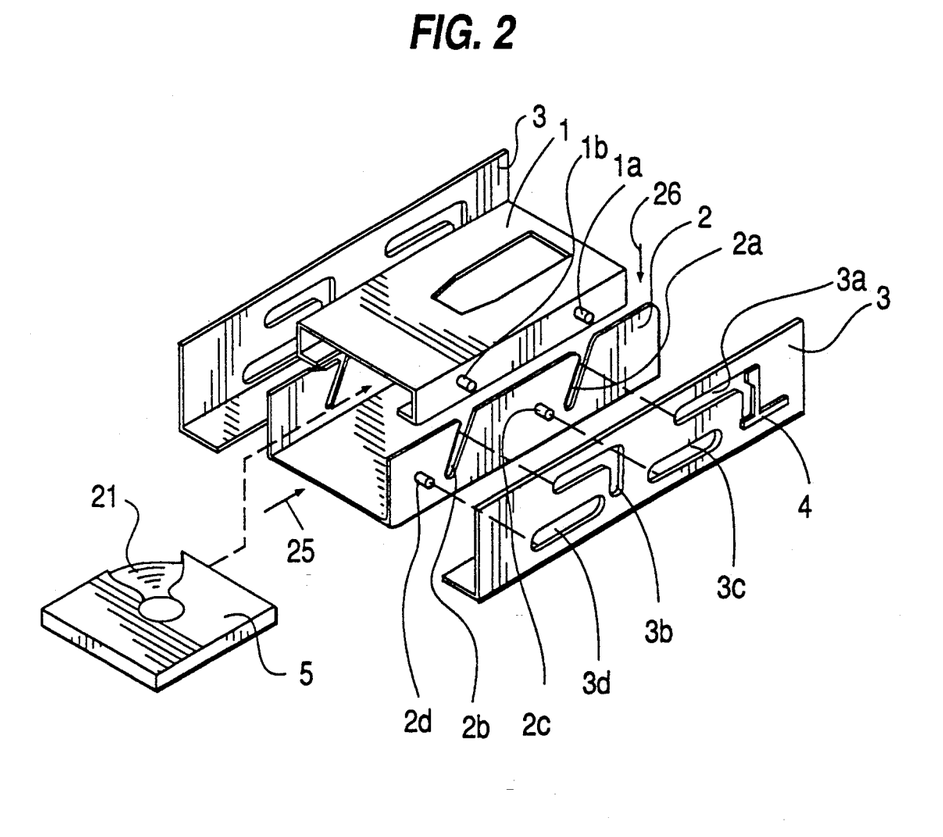
FIG. 2 is a perspective view showing the structure of a loading device of an information recording and reproducing apparatus including the objective lens driving apparatus of an embodiment in accordance with the present invention.

Next is described the loading mechanism of the information recording and reproducing apparatus including the objective lens driving apparatus as an embodiment of the invention shown in FIG. 2. In FIG. 2, element 21 is a disk-shaped recording medium, element 5 is a cartridge incorporating the disk-shaped recording medium 21, element 1 is a cartridge holder in which the cartridge 5 is inserted, elements 1a and 1b are sliding pins of the cartridge holder 1 element, 2 is a driving cam plate for transmitting the driving force to the cartridge holder 1; elements 2a and 2b are cartridge holder guide grooves of the driving cam plate, 2; elements 2c and 2d are sliding pins of the driving cam plate 2; element 3 is a fixing plate, elements 3a and 3b are cartridge holder guide grooves of the fixing plate 3, 3c, 3d are driving cam plate guide grooves of the fixing plate 3, element 4 is a changeover switch for changing over the current feed circuits in cooperation with the loading action of the disk-shaped recording medium 18; element 25 is the driving direction of the driving cam plate 2, and element 26 is the lowering direction of the disk-shaped recording medium 21.

The operation of the thus composed loading mechanism is described below.

In FIG. 2, the sliding pins 1a; and 1b of the cartridge holder 1 in which the cartridge 5 is inserted are inserted into the cartridge holder guide grooves 2a and 2b of the driving cam plate 2 and the cartridge holder guide grooves 3a and 3b of the fixing plate 3, and the sliding pins 2c and 2d of the driving cam plate 2 are inserted into the driving cam plate guide grooves 3c and; 3d of the fixing plate 3, respectively. When the driving cam plate 2 is driven in the driving direction 25 of the driving cam plate 2 and moves parallel along the driving cam plate guide grooves 3c and 3d of the fixing plate 3, the cartridge holder 1 is guided by the cartridge holder guide grooves 2a; and 2b of the driving cam plate 2 and the cartridge holder guide grooves 3a; and 3b of the fixing plate 3, and moves parallel in the driving direction 25 of the driving cam plate 2, and is then lowered in the lowering direction 26 of the disk-shaped recording medium 21, thereby loading the disk-shaped recording medium 21.

Figure 3:
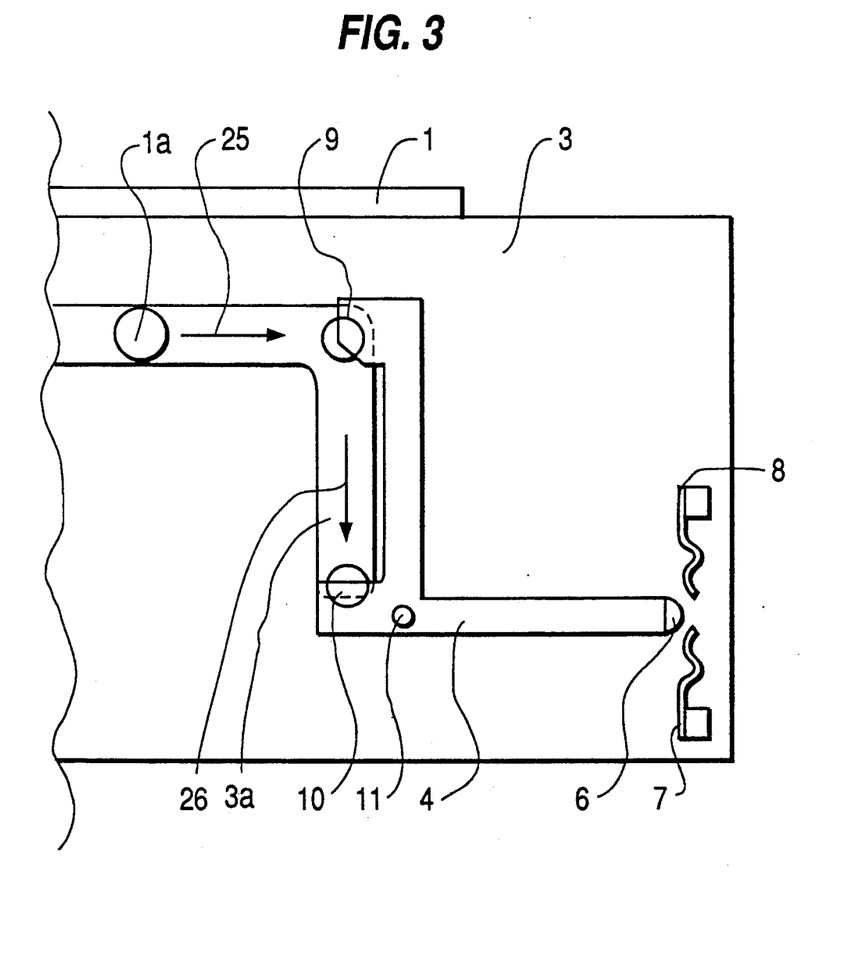
FIG. 3 is a front view showing the detail of the changeover switch shown in FIG. 2.

Referring next to FIG. 3, the changeover switch 4 of the loading mechanism in FIG. 2 is described in detail below. In FIG. 3, element 6 is a power source terminal, element 7; is a terminal a; element 8 is a terminal b; element 9 is a contact part a of the changeover switch 4; element 10 is a contact part b of the changeover switch 4, and element 11 is a rotary shaft of the changeover switch 4.

In the thus composed changeover switch 4 of the loading mechanism, the operation is described below.

In the operation of the loading mechanism shown in FIG. 2, when the cartridge holder 1 is guided by the cartridge holder guide grooves 3a and; 3b of the fixing plate 3 and moves parallel in the driving direction 25 of the driving cam plate 2, the sliding pin 1a of the cartridge holder 1 contacts the contact part a9 of the changeover switch 4, and the changeover switch 4 rotates about the rotatory shaft 11 of the changeover switch 4, so that the power source terminal 6 contacts the terminal a7. When the cartridge holder 1 is further guided by the cartridge holder guide grooves 3a and; 3b of the fixing plate 3 and is lowered in the lowering direction 26 of the disk-shaped recording medium, the sliding pin 1a of the cartridge holder 1 contacts with the contact part b10 of the changeover switch 4, and the changeover switch 4 rotates about the rotary shaft 11 of the changeover switch 4, so that the power source terminal 6 contacts the terminal b8.

Figure 4:
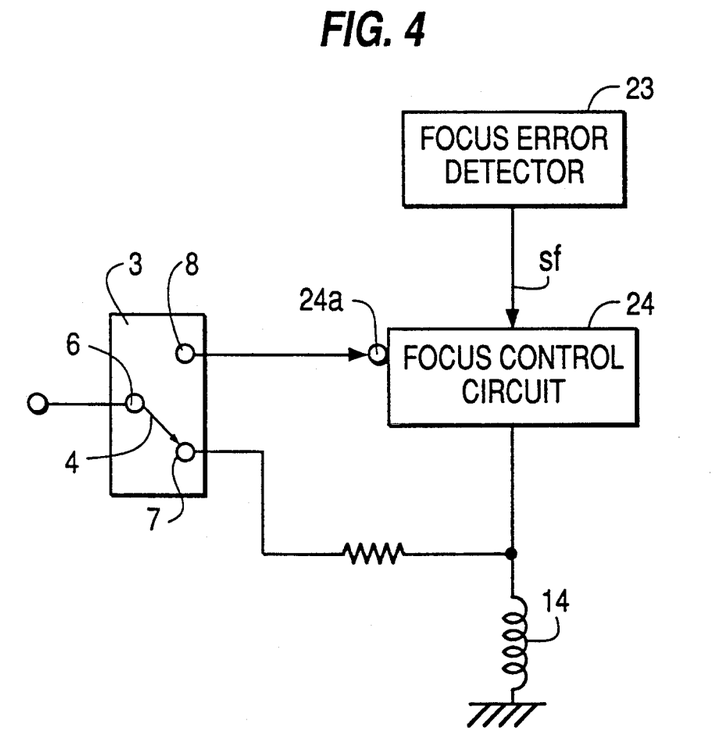
FIG. 4 is a circuit diagram showing a current feeding circuit in accordance with the objective lens of an embodiment of the present invention.

Referring to FIG. 4, a current feeding circuit of the objective lens driving apparatus in accordance with an embodiment of the present invention is described below.

In FIG. 4, element 23 is a known focus error detector for generating a focus error signal Sf from reflected light from the recording medium, and element 24 is a focus control circuit for generating a focus control current corresponding to the focus error signal. The focus control circuit 24 supplies a focus control current to the driving coil when a voltage is applied to the control terminal 24a.

When the changeover switch 4 rotates and the power source terminal 6 contacts the terminal a7, the objective lens 12 moves in the direction of departing from the disk-shaped recording medium 21 and a DC current is applied to the optical axis direction driving coil 14.

Or as the changeover switch 4 rotates until the power source terminal 6 contacts the terminal b8, a focus control current corresponding to the focus error signal Sf is applied to the optical axis direction driving coil 14 from the focus control circuit 24.

Figure 9:
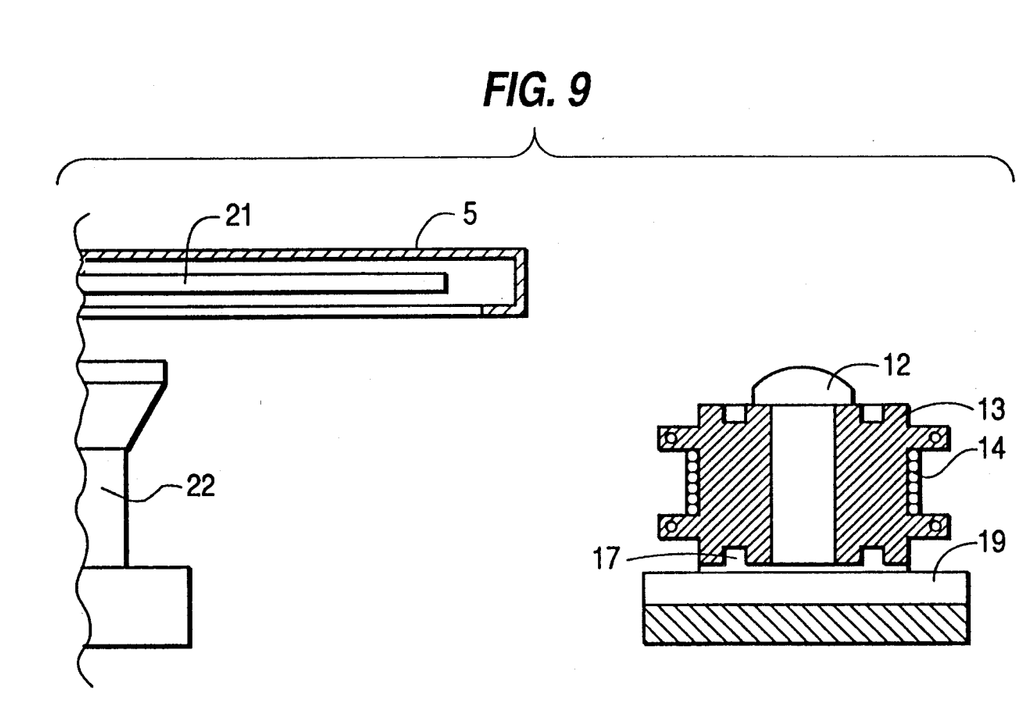
FIG. 9 is a sectional view of a—a of FIG. 6 showing the configuration of the objective lens and disk-shaped recording medium before the start of the loading action of the objective lens driving apparatus in accordance with an embodiment of the present invention.
Figure 11:
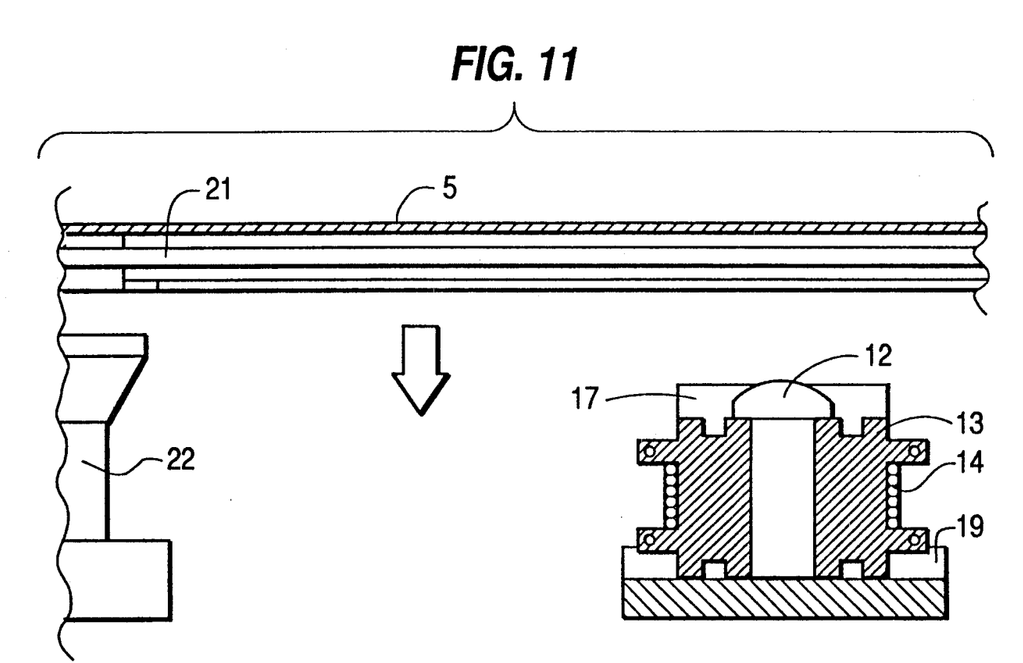
FIG. 11 is a sectional view of a—a of FIG. 6 showing the configuration of the objective lens and disk-shaped recording medium upon the start of the loading action of the objective lens driving apparatus in accordance with the present invention.
Figure 13:
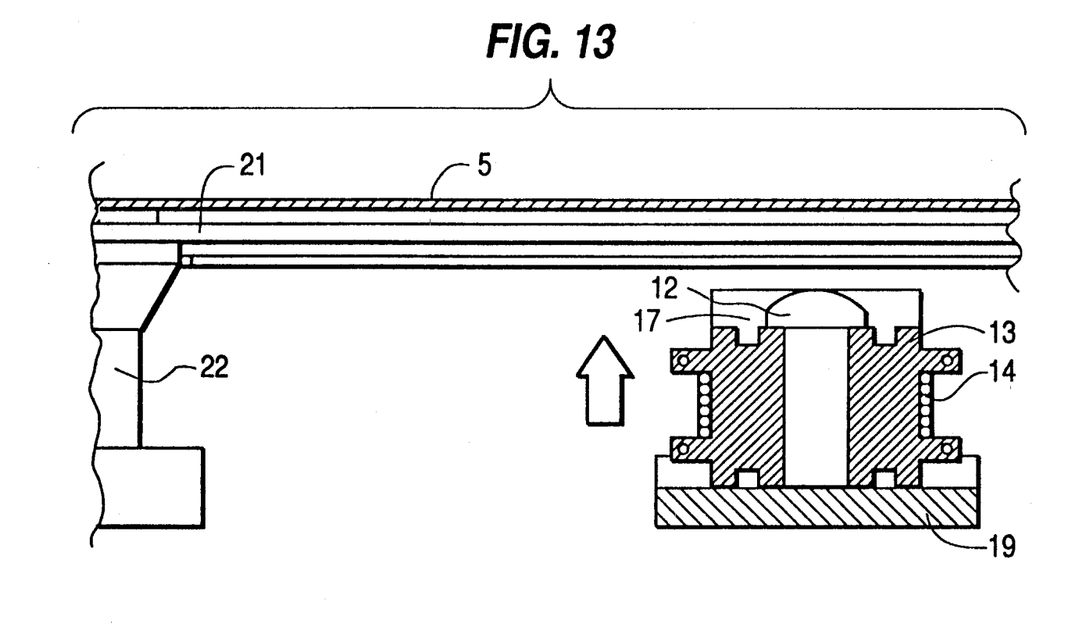
FIG. 13 is a sectional view of a—a of FIG. 6 showing the configuration of the objective lens and disk-shaped recording medium upon the end of the loading action of the objective lens driving apparatus in accordance with the present invention.

The operation of the objective lens driving apparatus in accordance with an embodiment of the present invention is described below with reference to FIG. 1 to FIG. 13. In FIG. 9, FIG. 11, and FIG. 13, element 22 is a spindle motor on which the disk-shaped recording medium 21 is mounted.

Figure 8:
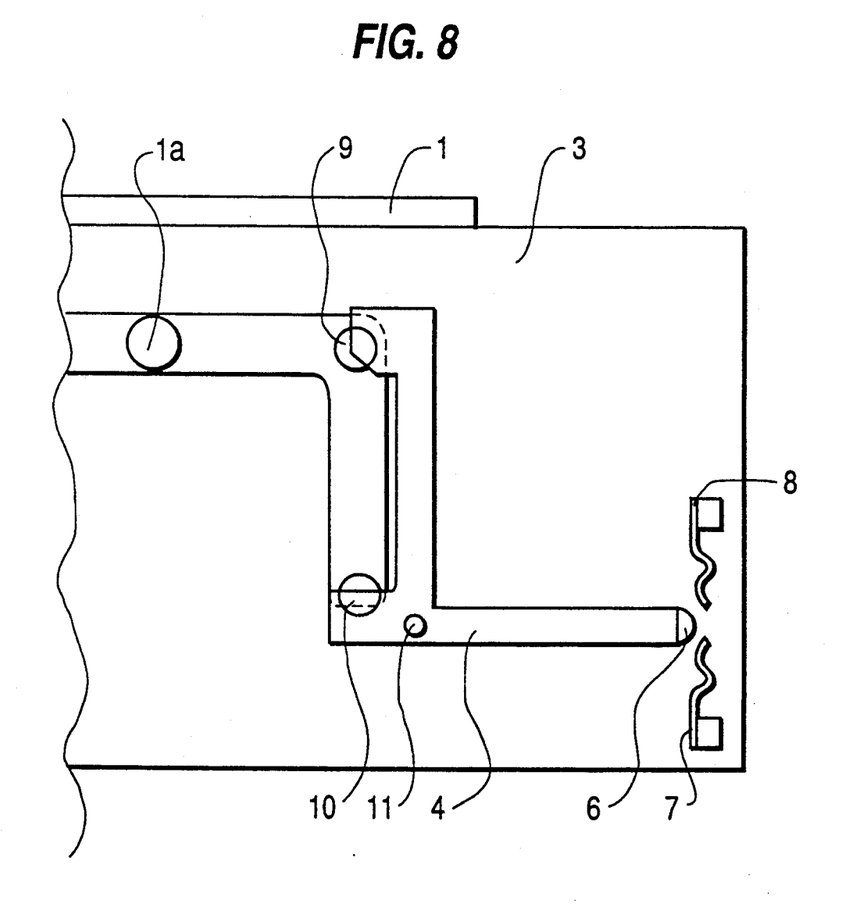
FIG. 8 is a front view showing the detail of the changeover switch of the loading mechanism before the start of a loading action of the objective lens driving apparatus in accordance with an embodiment of the present invention.

First is described the state in which electric power is not supplied to the optical axis direction driving coil as shown in FIG. 8 and FIG. 9, that is, the initial state before the objective lens 12 is driven. Prior to the start of the loading action of the disk-shaped recording medium 21 built in the cartridge 5, the changeover switch 4 of the fixing plate 3 is not connected to either terminal a7 or terminal b8 as shown in FIG. 8, and it is in an off state. At this time, the movable part consisting of the objective lens 12 and the optical axis direction driving coil 14 is supported by the bar-shaped elastic support members 15, and is positioned at a balanced location between the weight of the movable part and the elastic force of the bar-shaped elastic support members 14 as shown in FIG. 9.

Figure 10:
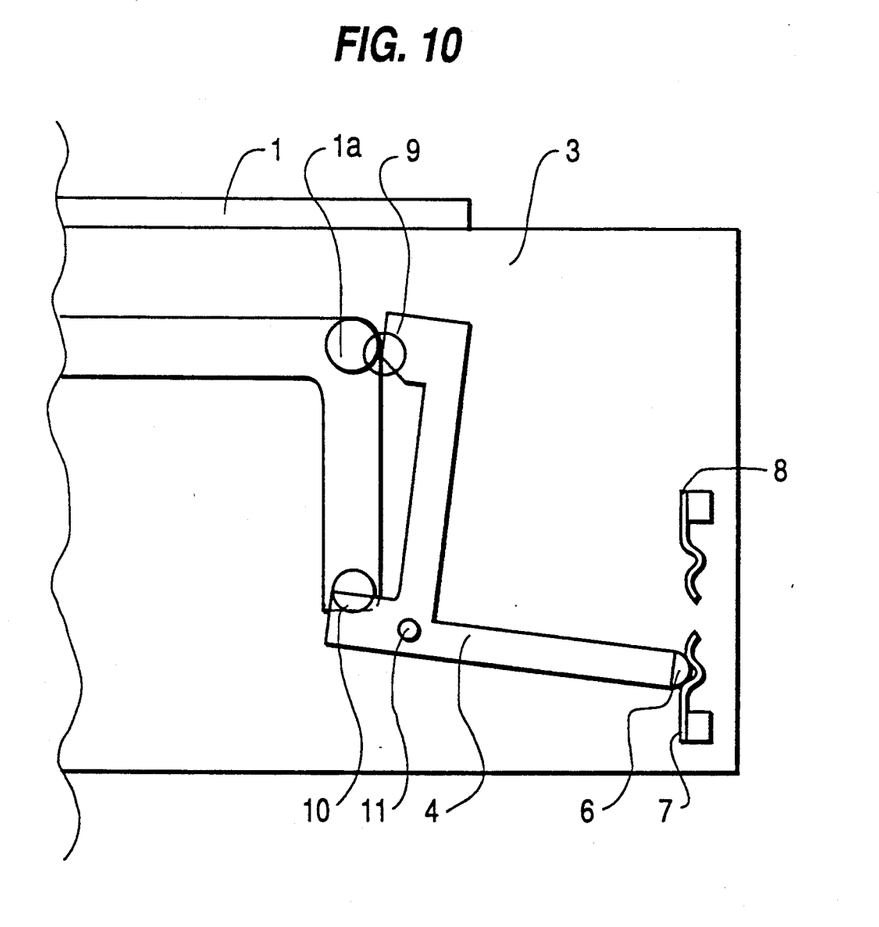
FIG. 10 is a front view showing the detail of the changeover switch of the loading mechanism upon the start of the loading action of the objective lens driving apparatus in accordance with an embodiment of the present invention.

The state upon the start of loading action shown in FIG. 10 and FIG. 11 is explained as follows. When the driving cam plate 2 is driven in the driving direction 25 of the driving cam plate 2, the cartridge holder 1 moves in a direction parallel to the driving direction 25 of the driving cam plate 2 as the sliding pins 1a and; 1b are guided in the cartridge holder guide grooves 3a and; 3b of the fixing plate 3. When the cartridge holder 1 moves parallel to the specified position, as shown in FIG. 10, the sliding pin 1a of the cartridge holder 1 contacts the contact part a of the changeover switch 4 to rotate the changeover switch 4, so that the changeover switch 4 is connected to the terminal a. Therefore, a DC current in a direction of the movable part departing from the disk-shaped recording medium 21 is supplied to the optical axis direction driving coil 14 through the circuit of the terminal a7 of the current feeding circuit shown in FIG. 4. As a result, as shown in FIG. 11, the objective lens 12 is located at the remotest position from the disk-shaped recording medium 21 due to the electromagnetic force generated between the DC current flowing in the optical axis direction driving coil 14 and the permanent magnet.

Figure 12:
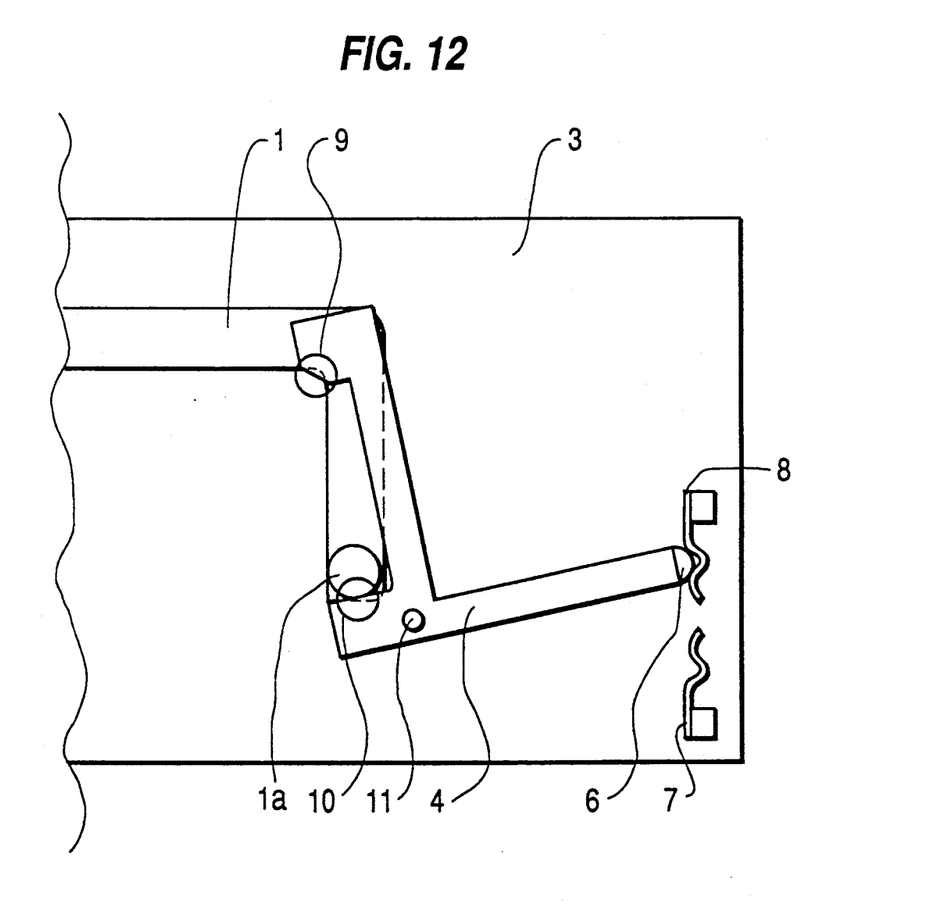
FIG. 12 is a front view showing the detail of the changeover switch of the loading mechanism upon end of loading action in accordance with the objective lens driving apparatus of an embodiment of the present invention.

In FIG. 12 and FIG. 13, the loading action is completed, that is, the disk-shaped recording medium 21 is set at the specified position of the spindle motor 22. The driving cam plate 2 further moves parallel to the driving direction 24 of the driving cam plate 2, the sliding pins 1a and; 1b of the cartridge holder begins to descend in the lowering direction 26 of the disk-shaped recording medium, and the disk-shaped recording medium 21 finishes its lowering at the specified position with respect to the spindle motor 22, then, as shown in FIG. 12, the sliding pin 1a of the cartridge holder 1 contacts the contact part b of the changeover switch 4 to rotate the changeover switch 4, so that the changeover switch 4 is connected to the terminal b8. Therefore, a supply voltage is applied to the control terminal of the focus control circuit 24, and the focus control circuit 24 feeds the focus control current corresponding to the focus error signal Sf to the driving coil 14. Consequently, as shown in FIG. 13, the objective lens 12 begins to control the focus on the recording plane of the disk-shaped recording medium 21 while approaching the disk-shaped recording medium 21.

Figure 1:
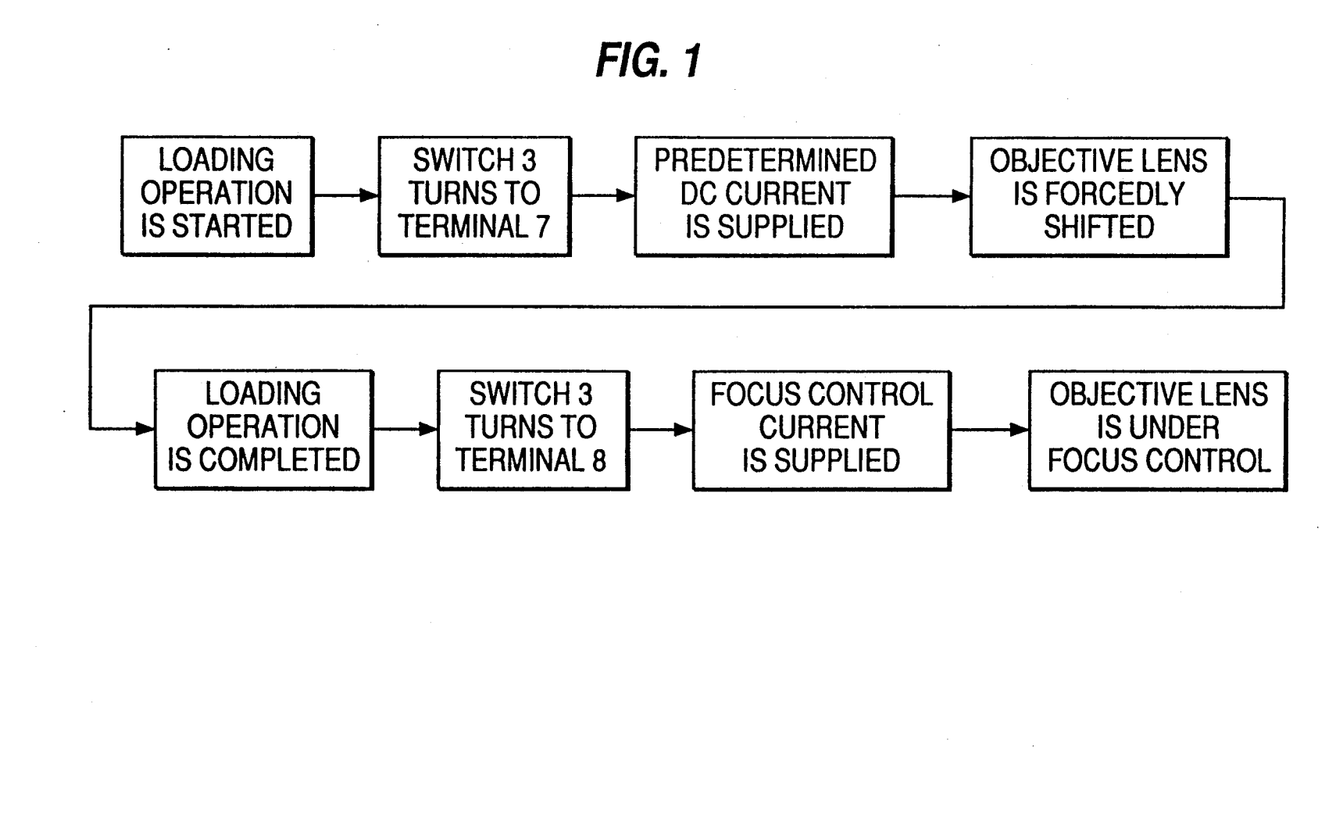
FIG. 1 is a sequence diagram showing the operation of an objective lens driving apparatus in accordance with an embodiment of the present invention.

The sequence of the operation stated above is described herein. As shown in FIG. 1, when the loading action begins, in the first place, the changeover switch 4 is connected to the terminal a7, and the DC current is supplied from the current feeding circuit to the optical axis direction driving coil 14, and the objective lens 12 moves in a direction of departing from the disk-shaped recording medium 21. When the loading action is complete, the changeover switch 4 is connected to the terminal b8, and the focus control current is supplied from the current feeding circuit to the optical axis direction driving coil 14, and the objective lens 12 begins focus control on the recording plane of the disk-shaped recording medium 21.

Thus, according to the embodiment of the invention, from the moment of the start of the descending of the disk-shaped recording medium 21 in the lowering direction 25 of the disk-shaped recording medium 21 by the loading mechanism until it is set at the specified position with respect to the spindle motor 22, a DC current in a direction of the movable part departing from the disk-shaped recording medium 21 is supplied to the optical axis direction driving coil 14 through the terminal a7 of the current feeding circuit, and the movable part is located at the remotest position from the disk-shaped recording medium 21 due to the electromotive force generated between the DC current flowing in the optical axis direction driving coil 14 and the permanent magnet. Therefore, even when an objective lens with a short working distance is used, the disk-shaped recording medium 21 will not collide against the objective lens 12.

As a result, the risk of collision of the disk-shaped recording medium 21 and the objective lens 12 is eliminated, and a small objective lens may be used without lowering the precision of recording and reproduction, so that the apparatus may be reduced in size and thickness.

What is claimed is:

1. An optical disk drive apparatus comprising:
    a disk loading means for loading an optical disk having a recording surface and inserted into said apparatus into a specified position;
    a disk driving means for rotating said optical disk in said specified position;
    a loading detecting means for detecting a loading operation of said disk loading means in which said optical disk is loaded into said specified position and for producing a loading detection signal indicative of said loading operation;
    an objective lens disposed so that an optical axis thereof is perpendicular to the recording surface of said optical disk in said specified position for writing optical information on and reading optical information from said optical disk in said specified position;
    a supporting means for supporting said objective lens movably along the optical axis of said objective lens;
    a fixing part for fixing said supporting means; and
    a lens driving means for normally driving said objective lens to move along said optical axis relative to said fixing means so as to control a focusing condition on the recording surface of said optical disk, said lens driving means being responsive to said loading detection signal for driving said objective lens to move along said optical axis in a direction away from said optical disk.

2. An apparatus according to claim 1, wherein said lends driving means comprises:
    an electromagnetic driving means for generating a magnetic force according to an electric current applied thereto;
    a focus error detecting means for detecting an error of said focusing condition and for generating a focus error signal indicative of said error;
    a focus control means responsive to said focus error signal for generating an electric current to be applied to said electromagnetic driving means so as to move said objective lens in a direction to eliminate said error of said focusing condition;
    a current generating means for generating a specific electric current to be applied to said electromagnetic driving means so as to move said objecting lens in the direction away from said optical disk; and
    a switch means for selectively passing the electric current generated by said focus control means and the specific electric current generated by said current generating means to said electromagnetic driving means, said switch means normally passing the electric current generated by said focus control means to said electromagnetic driving means and being responsive to said loading detection signal for passing the specific electric current generated by said current generating means to said electromagnetic driving means.

* * * * *